United States Patent [19]
Lawson et al.
[11] 3,779,759
[45] Dec. 18, 1973

[54] LITHOGRAPHIC PRINTING PLATES WITH LACQUER OF RESOLE-EPOXY RESIN COMBINATION

[75] Inventors: Leslie Edward Lawson; Peter John Smith, both of Orpington, England

[73] Assignee: Howson-Algraphy Limited, Kent, England

[22] Filed: Aug. 17, 1971

[21] Appl. No.: 172,602

[30] Foreign Application Priority Data

Aug. 19, 1970 Great Britain .................. 40,015/70

[52] U.S. Cl. ..................... 96/33, 101/457, 101/463, 260/823, 260/838, 117/132 A

[51] Int. Cl. ............................................. G03f 7/02

[58] Field of Search ................ 96/33; 260/823, 838; 117/132 A; 101/463, 457

[56] References Cited

UNITED STATES PATENTS

| | | | |
|---|---|---|---|
| 3,514,288 | 5/1970 | Silver | 96/33 |
| 3,651,170 | 3/1972 | Silver | 96/33 |
| 3,459,128 | 8/1969 | Erdmann et al. | 96/33 |
| 3,455,688 | 7/1969 | Adams et al. | 96/33 |
| 3,406,065 | 10/1968 | Uhlig | 96/33 |
| 3,669,664 | 6/1972 | Adams | 96/33 |

*Primary Examiner*—Norman G. Torchin
*Assistant Examiner*—Edward C. Kimlin
*Attorney*—Sandoe, Hopgood & Calimafde

[57] ABSTRACT

A lacquer for lithographic printing plate production comprises a resinous material dissolved in an organic solvent. The resinous material comprises at least equivalent proportions of a resol resin and an epoxy resin and additional resol resin. The resol resin and the epoxy resin may be present as a mixture or they may be precondensed together. The lacquer readily accepts printing ink and may be stoved.

12 Claims, No Drawings

LITHOGRAPHIC PRINTING PLATES WITH LACQUER OF RESOLE-EPOXY RESIN COMBINATION

This invention relates to lithographic printing plates and is concerned with the production of such plates having improved printing images.

Frequently the ink accepting areas constituting the printing image of the modern lithographic or planographic printing plate consist of a thin layer of water insoluble polymeric or other material. This layer is carried on a support e.g. a thin aluminium foil, the surface of which may be specially treated to make it suitable for the purpose.

In the past, many modifications have been made to such lithographic plates and these have resulted in improved printing images. However, it is still common for such images to cease functioning correctly during the production of extended editions, such as may demand 100,000 or more satisfactory copies. This image failure may be brought about by the printer using unsuitable quality paper or ink, or by employing badly adjusted machinery. Such failure can be premature when these and possible other contributing factors occur at the same time.

Recent trends within the printing industry have resulted in a need for further improvement. One of these trends has been an increase in the use of "web-offset" to print newspapers — often on inferior paper and in adverse conditions. Another is a tendency to revert to the older method of "direct" lithographic printing which does not use an offset blanket and which causes the paper to be pressed directly into contact with the lithographic printing plate. A third trend is the desirability of using special inks to print on "plastic" materials. Equally demanding is the technique of printing which uses an alcoholic fountain solution containing e.g. between 8 and 30 percent of iso-propyl alcohol. A further hazard to which printing images are subjected, occurs when powerful solvents are used to clean printing plates by removing ink which has inadvertently been allowed to dry down on the plate.

Lithographic printing plates can be produced by the process known as the reversal process. One common form of this process is the so called "deep-etch" process. An example of such a deep-etch process involves cleaning a mechanically roughened aluminium support sheet with an aqueous 5 percent solution of acetic acid for aproximately two minutes, thoroughly washing the sheet and then coating the sheet with commercially available light sensitive dichromated polyvinyl alcohol solution with the aid of a heated rotating whirler operating at 110 to 120 r.p.m. After five minutes drying in the whirler, the resultant light sensitive plate is removed and the light sensitive layer thereof is exposed to actinic light whilst in contact with a line and dot structured photographic positive transparency. As a result of this image-wise exposure, those areas of the layer which are struck by light become insolubilised. After the exposed plate has been removed from contact with the transparency, the non-light-struck areas of the layer are completely removed from the sheet by development in clean running water for several minutes. The developed plate is then dried off in the whirler. The underlying areas of the sheet which are revealed on removal of the non-light-struck areas of the layer are then "deep-etched" for three minutes at room temperature with an appropriate solution. This etching step recesses the image approximately 0.0002 inches. The plate is then well washed again under running water and dried. At this stage a thin layer of an "image-base" or a "deep-etch lacquer" as it is frequently called is applied to the plate and dried. The formulation of a typical deep-etch lacquer is Bakelite (Trade Mark) VMCH resin — 100 g
di-iso-butyl-ketone — 900 ml The choice of solvent, and diluent if any, depends on the size of plate to be covered and the prevailing temperature when used. After application of the lacquer, a thin layer of greasy black ink is applied and dried. The solubilised light-struck areas of the layer are then removed, together with the overlying ink, and the underlying areas of the sheet thereby revealed are desensitised with a suitable solution which may contain phosphoric acid and gum arabic. The areas coated with the lacquer constitute the printing image of the plate.

Recent improvements in the art have shown that the reversal process can be carried out with the omission of the etching stage in suitable circumstances to permit the more economical and rapid production of suitable printing plates from positives. Although such a reversal process is somewhat different, it is broadly in accord with the above. Moreover, although a poly (vinyl alcohol) coating is used in the above example, alternative light-sensitive coatings, e.g. based on gum arabic, may be used in the reversal process.

Lacquers other than the vinyl resin-based lacquer described above may be used to form the printing image and the printing life of the resultant plate is dependent othe lacquer used. If, when making a grained aluminium deep-etch plate by the above method, the printing image is formed by applying a lacquer comprising a novolac resin in a solvent, the image is weak and deteriorates unduly after the plate has been used to produce approximately 25,000 copies. Experience has shown that a deep-etch plate comprising a grained aluminium sheet carrying a printing image formed from a lacquer based on a vinyl resin (e.g. Bakelite VMCH) is capable of giving on average some 70,000 copies before undue deterioration occurs. In adverse circumstances considerably less than this number may have been printed before the quality of the copies deteriorates; in favourable circumstances more than 70,000 good copies may be obtained. If a thin layer of copper is deposited on the etched areas of the aluminium sheet prior to the application of the vinyl lacquer, considerably more than 70,000 copies can be obtained. Printing trials have shown that a novolac printing image is inherently weak and needs to be four times as thick as a vinyl printing image before it will last as long on the press. Further, a novolac printing image is known to deteriorate when subjected to strongly alcoholic fountain solutions and it is also known that vinyl printing images can be softened and weakened by solvent action from unsuitable inks and plate cleaning fluids, for instance, from solutions containing methyl ethyl ketone.

Another type of lithographic printing plate having a polymeric printing image can be produced from presensitised light sensitive plates which comprise a support sheet carrying a layer of photosensitive material. In use, the layer of photosensitive material is image-wise exposed and then developed to remove from the support sheet the relatively more soluble areas of the image-wise exposed layer and leave an image constituted by the relatively less soluble areas of the image-wise exposed layer. Image reinforcing lacquers (also known as developing or intensifying lacquers) are used in conjunction with such pre-sensitised plates based on negative working materials such as diazo resins. In this case, the presensitised negative working light sensitive plate is image-wise exposed and then rubbed with an emulsion lacquer comprising a solvent phase containing a resin. As a result of this rubbing step, which may constitute the sole processing operation on the image-wise exposed plate, the image areas accept resin from the solvent phase of the emulsion. The resin deposited on the image constitutes the printing image of the plate. The solvent phase of a typical emulsion lacquer can consist of a solution of an epoxy resin or a novolac in a water immiscible solvent.

When an epoxy resin is used as the resin component of such an emulsion lacquer, the resultant epoxy resin printing image, although hard wearing is not tough enough for extended runs unless subjected to extended heating and is reluctant to accept ink when dampened with fountain solution in the normal manner. Also the epoxy resin printing image is not particularly resistant to attack from the acidic cleaning and fountain solutions to which it is subjected whilst printing. When a novolac resin is used in the emulsion lacquer, the printing image is weakened by solvents and is considerably weaker, when subjected to mechanical wear whilst printing, than an epoxy resin printing image but is much more resistant to attack by acidic materials. Mixtures of epoxy and novolac resins (e.g. in equal parts by weight) have been used in emulsion lacquers. However, whereas a potentially useful product for short runs can be produced in this way difficulties arise as soon as attempts are made to further improve the printing life by heating (or stoving) the image. The well known phenomena of "crawling" and "cissing" of the resin constituting the printing image occur once the curing temperature is attained.

It is also known to use lacquers comprising as the sole resinous component, heat reactive phenol/formaldehyde condensation products for producing lithographic printing plates. The resultant printing images have good ink receptivity but cannot be used for extended printing runs unless heated.

A further type of lithographic printing plate is produced by the "silver diffusion transfer process." Lacquers are also used to reinforce the printing images of such plates.

The prior art relating to image lacquers is summarised in the decision of the U.S. Court of Customs and Patent Appeals dated April 10, 1969 in In re. John V. Harrington and Henning H. Borchers (161 USPQ 290).

It has now surpisingly been found that by producing an image lacquer containing as the resinous component a mixture comprising a resol resin and an epxoy resin in appropriate proportions, the aforementioned disadvantages can be overcome and, more particularly, the resultant printing image, whether subsequently heated or not, readily accepts printing ink and is resistant to wear and printing chemicals.

According to one aspect of the present invention there is provided provied lacquer suitable for use in the production of lithographic printing plates which lacquer comprises an organic solvent solution of a resol resin/epoxy resin mixture wherein the proportion of resol resin present is equal to or greater than the equivalent proportion.

According to another aspect of the present invention there is provided a lithographic printing plate having an optionally stoved printing image which includes a resol resin/epoxy resin mixture wherein the proportion or resol resin is equal to or greater than the equivalent proportion.

If desired, minor amounts of other resins such as novolac resins may be present in the lacquer. Also the usual dyes or pigments may be present.

The lacquers of the present invention are useful as lacquers in reversal process (such as the deep-etch process), as emulsion lacquers, and as lacquers in the silver diffusion process. By utilising image lacquers in accordance with the present invention, it is possible to overcome the aforementioned disadvantages of conventional deep-etch lacquers and emulsion lacquers.

When the image lacquers of the present invention are used as deep-etch lacquers mechanically stronger and more chemically inert printing images are obtained from the outset. When the image lacquers are used as emulsion lacquers in conjunction with lithographic plates of the presensitised type, the original images on the plate are reinforced. In either case, the final printing images are more resistant to the stringent conditions likely to be encountered in different printing establishments.

The solvent used to produce the lacquers of the present invention may be any appropriate organic solvent or mixture of organic solvents. Generally the solvent or solvent mixture will be immiscible with water. This is particularly the case if the lacquer is to be used as an emulsion lacquer in conjunction with an aqueous phase. The resin content of the lacquer should be as high as possible. Generally, but depending on solubility, the resin content will be from 10 to 50 percent although resin contents outside this range may be of use in certain circumstances.

The term "resol resin" is used in this specification in its conventional sense to mean a heat hardening resin consisting of the complex mixture of mono and poly nuclear molecules joined via methylene or dimethyleneoxy linkages and containing free methylol groups which is obtained by condensing together phenol and excess aldehyde (formaldehyde in practice) in the presence of alkali. Resol resins are defined in B.S. 1755 1951 and a probable typical structure of a resol resin is as follows:

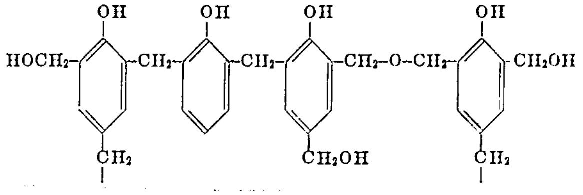

The free methylol groups allow self-curing to occur under the influence of heat and/or an acid catalyst. Resol resins are prepared by reacting formaldehyde and a phenol in a molar ratio of greater than 1:1, often as high as 1.5:1, in the presence of an alkaline catalyst and are soluble in organic solvents. The resol resins used in accordance with the present invention are quite conventinal and correspond to the A-stage resin described on page 295 of "Preparative Method of Polymer Chemistry" 1961, by Sorenson and Campbell. a commercially available resol resin which may be used is that known as Phenodur 897 U (formerly known as Pioneer Resol Resin PC 897 of Frederick Boehm Limited). This resin is available from Chemische Werke Albert, Wiesbaden Biebrich.

The term "epoxy resin" is used in this specification, in its conventional sense to mean products containing more than one

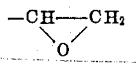

group Conventional molecule. Convention epoxy resins having the structural formula

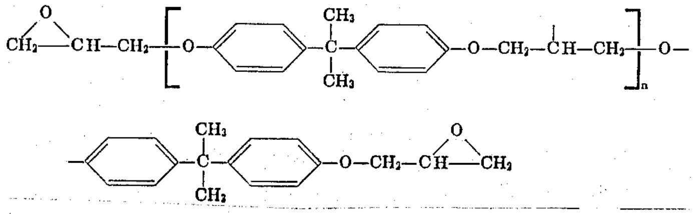

may be prepared by reacting diphenylol propane and excess epichlorhydrin in the presence of sodium hydroxide. The greater the excess of epichlorhydrin, the less the molecular weight of the epoxy resin. The epoxy resins used in accordance with the present invention are quite conventional and an example of such a resin is the condensation product of diphenylol propane and epichlorhydrin having a molecular weight of from about 2,000 to 5,000. Commercially available epoxy resins which may be used are the normally solid Epikotes (Trade Mark) of Shell Limited such as Epikote 1001, Epikote 1007, and Epikote 1009. These resins are condensation products of epichlorhydrin and dihydroxy diphenyl propane. Epikote 1007 has a specific gravity at 20°C. of 1.147, a refractive index at 20°C. of 1.598, an equivalent weight (i.e. grammes of resin required to completely esterify 1 g. mole of a monobasic acid) of 190, a molecular weight of 2900, a value of $n$ in the above formula of 8.8, and a viscosity of 17.5 to 27.0 poises (40 percent solution in butyl "Dioxitol" at 25°C.) The corresponding properties of Epikote 1001 and 1009 are: specific gravity 1.206 and 1.190, refractive index 1.595 and 1.601, equivalent weight 130 and 200, molecular weight 900 and 3750, value of $n$ 2.0 and 12.0, and viscosity 0.8 to 1.7 and 36.2 to 98.5, respectively.

The term "novolac" is used in this specification in its conventional sense as defined in B.S. 1755 1951. The novolac which may be present in the lacquer is quite conventional.

In a mixture containing equivalent proportions of resol resin and epoxy resin, the number of hydroxyl groups contributed by the resol resin is equal to the number of epoxy groups contributed by the epoxy resin. The resol resin and the epoxy resin are present in at least approximately equavalent proportions, e.g. at least 30 percent resol resin and not more than 70 percent epoxy resin. Subject to this limitation, the relative proportions of the resol resin and the epoxy resin may be varied as desired in dependence upon the requirement in any particular case. Thus, on a weight basis, the optimum proportions of resol resin and epoxy resin are about 67 percent of resol resin and about 33 percent of epoxy resin. However, it has been found that good results can be obtained wherein the resin mixture comprises up to 80 percent by weight of resol resin. Substantial further increases in resol resin content lead to unsatisfactory results in that the resultant plate is not suitable for extended runs unless heated. Excess resol in the resin mixture improves the ink acceptance of the lacquer irrespective of whether or not the image is heated.

The epoxy resin and some or all of the resol resin may be precondensed together by heating e.g. for about 2 hours at about 135°C. followed by the addition of the remainder of the resol. In this way the storage properties of the lacquer are improved. The precondensing step may be carried out in a manner similar to that described in the Appendix to Shell Chemicals Bulletin No TB/Res/162/1. Alternatively the epoxy resin and the resol resin may be present as a mere admixture.

The lacquers of the present invention give rise to printing images which generally have some resistance to aqueous acidic solutions and solvents used as cleaning fluids and to alcoholic fountain solutions without recourse to a heating or stoving step. However, although it is not necessary to subject to heating or stoving the printing images produced using the lacquers of the present invention, it has been found that whereas novolac resins could only be used in conjunction with an epoxy resin as indicated earlier provided no heating or stoving was carried out, when a resol resin is incorporated in such a mixture of novolac and epoxy resin, subsequent stoving in a conventional manner e.g. at 200°C., for quite lengthy periods is possible without deterioration occurring. Thus the lacquer of the present invention may also include a minor amount of a novolac to improve ink receptivity without affecting stoving performance. Although such stoving is an optional step, a considerable improvement is obtained by so doing. Indeed, printing images having a printing life four or fives times that obtained using conventional lacquers have been obtained in this way. Moreover it is not necessary first to deposit a layer of copper on the image areas in order to obtain a commercially satisfactory printing life, although such a layer can be deposited, if desired.

In the case where the lacquer is for use as a reversal (including deep-etch) lacquer, it will generally consist of a single liquid phase comprising the organic solvent solution of the mixed or precondensed resol and epoxy resins. Equal parts by weight of the two resins to form a 12 percent by weight solution in the organic solvent are suitable. Improved stability of the solution is obtained if the two resins are pre-condensed in a solvent by heating for example, for 2 hours at 135°C. In the case where the lacquer is for use as an emulsion lacquer for developing, intensifying or reinforcing image areas, the organic solvent should be water-immiscible and the second phase of the emulsion should be a suitable aqueous phase. For example, the organic solvent phase may comprise 150 g. of resol resin, 150 g. of epoxy resin, 700 ml. of butoxyl (3-methoxy butyl acetate) as solvent, and a suitable dye, this phase being emulsified with 1½ volumes of water to form an oil-in-water emulsion. Generally, the aqueous phase contains one or more lithographic desensitising materials such as gum arabic and other materials capable of thickening and improving the stability of the emulsion.

The following Examples illustrate the invention.

EXAMPLE 1

A conventional grained aluminium deep-etch lithographic printing plate was prepared. A sheet of grained aluminium was cleaned with a 5 percent aqueous solution of acetic acid for two minutes after which it was washed well and coated with a commercially available dichromated polyvinyl alcohol deep-etch coating solution with the aid of a heated rotating whirler operating at 120 r.p.m. After six minutes the coated plate was removed and exposed to actinic light whilst in contact with a half-tone dot-structured photographic positive using an open carbon arc lamp for 2½ minutes located four feet from the plate. The plate was then fully developed with clean running water for three minutes and then dried off in the whirler. The image areas were deep-etched in the cumstomary manner for 4 minutes at room temperature, and then well washed under running water before re-drying. Half of the image was then formed into a printing image by applying a commercial deep-etch base or lacquer containing 11 percent w/v of VMCH Vinyl resin in a solvent and a suitable colourant. (VMCH Vinyl resin is a copolymer of vinyl chloride and vinyl acetate containing 1 percent maleic anhydride.) The other half of the image was formed into a printing image was a resol-epoxy resin lacquer of the following composition:

Shell Epikote resin 1007 — 70 grams
Phenodur 897 U — 45 grams
butoxyl — 200 c.c.
di-iso-butyl-ketone (Trade Mark) — 50 c.c.
Waxoline violet dye (I.C.I. Ltd.) — 1.15 grams The lacquer was produced by stirring together the crushed resins, dye and solvents at room temperature until dissolution occurred.

After drying and applying a thin layer of greasy black ink, the polyvinyl alcohol stencil was removed, and the non-printing areas were desensitised with a gum arabic/phosphoric acid solution. The resultant printing plate was then mounted on an offset printing machine or press. Satisfactory printing performance was obtained until similar deterioration of both printing images occurred after 45,000 impressions had been taken.

EXAMPLE 2

A printing plate was made in the manner described in the preceding Example but the printing images were stoved for 2 minutes at 200°C. The printing image constituted by the blue Resol-Epikote lacquer changed to a grey-green colour and was found to be unaffected by several applications of methyl ethyl ketone. The vinyl printing image was found to be removed by this solvent in a small test area in the same manner as it had been prior to heating. Printing trials using the stove plate and the same machine, paper and ink as employed in the previous Example, showed that the stoved vinyl lacquer printing image deteriorated after 45,000 impressions whereas the stoved epoxy resin-resol printing image had not deteriorated to the same degree until a total of 92,000 satisfactory copies had been obtained.

EXAMPLE 3

A negative working presensitised plate comprising grained aluminium coated with poly (vinyl cinnamate) was exposed in contact with two identical photographic line negatives. It was then processed in a plate processor, using a red coloured developer to produce a red image as described in British Patent Specification No. 921529.

One of the images was wetted with a thin film of water and rubbed with emulsion lacquer. The dispersed solvent phase of the emulsion lacquer consisted of a mixture of the following resins in the solvents given which mixture had been refluxed for 2 hours to "precondense" the resins by reaction of epoxy groups of the Epikote resin with hydroxy groups of the resol:

Epikote resin 1007 — 70 grams
Phenodur 897 U — 30 grams
isophorone —60 c.c.
butoxyl — 180 c.c.
di-iso-butyl-ketone — 40 c.c.
Waxoline Violet dye — 1 gram
(I.C.I. Ltd)

In this mixture, the epoxy resin and the resol resin are present in substantially equivalent proportions. This organic solvent phase was used in the ratio of one volume to one and one half volumes of an aqueous phase composed of:

water — 100 ml c.c.
glycerine — 15 ml
ethylene glycol — 30 ml
concnetrated gum arabic solution — 150 ml When the image had taken on a deep violet colour, the excess solution was removed and the plate preserved by applying and drying down a thin layer of gum arabic in the usual manner. The other image was not further treated.

When the plate was used in an offset printing machine, the lacquer treated image was initially slow to accept ink. After satisfactory printing for several hours it was found that the untreated image was showing distinct signs of wear when a total of 55,000 copies had been obtained. The lacquer treated image did not deteriorate to the same degree until 100,000 copies had been printed.

EXAMPLE 4

Example 3 was repeated but, in this case, the solvent phase of the emulsion lacquer contained resol resin in addition to that precondensed with the epoxy resin. The solvent phase was produced by heating and stirring a mixture of 100 g Epikote 1007
45 g Phenodur 897 U
300 ml butoxyl at approximately 135°C. for 2 hours. Thereafter there was added to the resultant precondensate:

25 g Phenodur 897 U
75.0 ml di-iso-butyl-ketone
1.5 g Waxoline Violet dye

The plate was finally desensitised and gummed with an aqueous solution of phosphoric acid and gum arabic.

On printing it was found that the lacquer treated printing image accepted ink much more readily than before. After further printing in the same manner as the previous Example, it was still found that the treated image was much less worn than the untreated image.

EXAMPLE 5

Example 4 was repeated with the additional step of heating the plate at 200°C. for 2 minutes before desensitising and gumming.

On printing, the rate of ink acceptance of the lacquer treated image was found to be excellent. When the plate was subjected to adverse test printing conditions, it became apparent that the wear resistance of the lacquer image was very remarkable. It was estimated that approximately four or five times the normal number of satisfactory copies would be obtained, i.e. 200,000 under average printing conditions.

EXAMPLE 6

A presensitised negative working plate comprising a grained and anodised sheet of aluminium coated with a poly (vinyl cinnamate) material and supercoated with a red colourant (as described in our British Patent Specification No. 1,244,723) was exposed beneath a negative to a light source emitting ultra-violet and blue light. The plate was processed by rubbing with an organic solvent as described in the same British Patent Specification and washed. The resultant red-coloured image was reinforced by applying a pool of emulsion of freshly prepared lacquer and rubbing it evenly over the plate. The solvent phase of the lacquer consisted of butoxyl — 360 cc
isophorone — 20 cc
Phenodur 897 U — 140 g
Epikote 1007 — 70 g
Waxoline Yellow I.S. — 1 g
Waxoline Blue — 0.5 g The aqueous phase was that used in Example 3 and constituted 70 percent of the final volume of the emulsion. Care was taken to avoid depositing resin on the non-printing areas. The plate was rinsed clean, dried and then heated at 180°C. for 6 minutes. No degradation of the reinforced image occurred during the heating and, after final desensitisation, the plate was ready for use on a lighographic printing machine. The ink acceptance of the image was rapid and good and the image was resistant to rubbing with methyl ethyl ketone. When used on a web-offset printing machine, 300,000 good copies were obtained.

EXAMPLE 7

A grained, anodised and presensitised negative working plate similar to that of Example 3 was exposed under two similar half-tone negatives. The plate was then automatically processed in a plate processor. The plate was then cut into two halves. One half was treated with an emulsion lacquer of which one third consisted of a dispersed solvent phase comprising:

Epikote resin 1007 — 200 g
Alnovol (Trade Mark) 420K — 200 g
butoxyl — 550 ml
cyclohexanone — 50 ml
Oil Red dye 153038 (Williams Ltd) — 2 g Alnovol 429K is a cresol formaldehyde novolac resin of Chemische Werke Albert and the solvent phase was produced by stirring the crushed resins in the solvents at room temperature. The aqueous phase of the emulsion consisted of two parts by volume of the aqueous solution used in Example 3.

Both halves of the plate were rinsed, coated with a thin layer of gum arabic and dried. After a day they were placed in an offset printing machine and found to possess good ink acceptance. The untreated section of the plate gave about 55,000 good copies while the lacquered section gave 70,000 copies before deterioration began.

EXAMPLE 8

Example 7 was repeated but in this case the lacquer treated plate was stoved at 200°C. for 2 minutes. The image was found to have "cissed" badly and to have become pock-marked.

EXAMPLE 9

A positive working plate comprising a quinonediazide light sensitive coating was image-wise exposed behind a line and half tone positive. After developing to remove the light-struck areas and desensitising the non-printing areas, one half of the image was treated with an emulsion lacquer in which the solvent phase consisted of the following:

Epikote resin 1007 — 50 g
Phenodur 897 U — 60 g
butoxyl — 150 ml
Waxoline Victoria Blue — 0.25 g
Oil Red 153038 — 0. 5 g
Waxoline Yellow I.S. — 0. 5 g The solvent phase was produced by stirring the crushed resins in the solvent at room temperature. On removing the excess lacquer from the plate and moistening the plate with a thin layer of clean water, the image was inked by rubbing soft greasy black ink evenly all over the image whereupon the coloured image areas immediately accepted a complete layer of the ink within a few seconds. That half of the image which had not been treated with lacquer, was only partially inked during the same time.

EXAMPLE 10

A grained and anodised aluminium sheet produced in accordance with our British Patent Application No. 31982/71 was washed and then whirler coated at 110 r.p.m. with a proprietory light sensitive solution of dichromated polyvinyl alcohol. When dry the resultant light sensitive plate was located in contact with a positive line reproduction of fine type in a vacuum contact frame and exposed to the light of an Addalux mercury halide lamp. The exposed plate was then thoroughly developed with clean water and dried. After "staging out" the unwanted areas, a printing image was formed by applying a thin layer of the resol/epoxy resin deep-etch lacquer used in Example 1 and drying. No deep etching was carried out. After the application of greasy black ink to improve image visibility, the stencil constituted by the light-struck areas of the light-sensitive coating was removed and the revealed areas of the anodised aluminium sheet were desensitised in the usual way to form the non-printing areas. The resultant printing plate was found to be capable of producing about 50,000 copies before visible deterioration of quality occurred.

On repeating the above procedure with the additional step of stoving the printing image at about 200°C. for about 2 minutes and then cleaning the image, it was found that considerably more copies could be produced. After, the production of 200,000 copies there was no indication of any deterioration in the quality of the image.

EXAMPLE 11

This Example illustrates how the image lacquer of the invention can be used in conjunction with the "silver diffusion transfer process" of making plates for small offset printing machines. This process is also known as the "chemical transfer process" and is referred to as the "Instafax Process" when marketed by Kodak Limited London.

A silver chloride photosensitive layer on baryta coated paper was epxosed in a camera to a line original for 18 seconds. The exposed negative and a suitable sheet of aluminium were passed through an apparatus commonly used for the silver transfer process and containing the usual mono-bath developer. In the apparatus, the negative and the aluminium sheet were pressed between rubber rollers. Two minutes after emerging from the apparatus, the negative was separated from the aluminium sheet. The working surface of the aluminium sheet was then desensitised with a customary "fixing solution." Thereafter a pool of the emulsion lacquer of Example 6 was applied to the working surface and spread and rubbed evenly over the image with a pad until the image was uniformly covered with the lacquer. The printing plate was completed by washing, drying, heating at about 200°C. for about 2 minutes, and cleaning. The image of the printing plate had excellent ink-receptivity and resistance to wear. More than 100,000 satisfactory copies were produced before noticeable deterioration in quality was detected.

EXAMPLE 12

A number of light sensitive plates comprising aluminium coated with dichromated polyvinyl alcohol was exposed, developed, etched, washed and dried in accordance with Example 1. The image of each plate was then formed into a printing image with a resol resin/epoxy lacquer comprising Phenodur 897 U and Epikote 1007 in the proportions 3:1 by weight. The plates were then heated for the periods indicated in the following Table at the indicated temperatures. After heating, a plate cleaning fluid was applied to each plate and the resistance of the image to the fluid was noted. The results obtained are shown in the Table.

TABLE

| Time | Temp 100°C. | 125°C. | 150°C. | 200°C. |
|---|---|---|---|---|
| 1 min | None | None | None | Fairly good |
| 1½ mins | None | None | Slight | Good |
| 2 mins | None | Slight | Good | Good |
| 2½ mins | None | Good | Good | Good |
| 5 mins | V. Slight | Good | Good | Good |

It may be noted that the images were resistant to the fluid at stoving temperatures much lower than those conventionally used (i.e. about 140°C. for 10 minutes). Thus, printing plates including the lacquers of the present invention can be stoved at temperatures at which the metal does not tend to distort. Thus specially tempered metal or special alloy does not have to be used. Further, there is less tendency for ink accepting residues to be formed on the non-printing areas. Methyl ethyl ketone was used as the cleaning fluid. The experiments were repeated using butoxyl as the cleaning fluid and similar results were obtained.

We claim:

1. Process for producing a lithographic printing plate by a reversal process, which comprises the steps of:

a. image-wise exposing a light-sensitive plate comprising a support coated with a light-sensitive layer, b. developing the image-wise exposed layer selectively to remove the relatively more soluble areas of the image-wise exposed layer and to reveal the underlying areas of the support, c. applying to the developed plate a lacquer comprising a resinous material dissolved in an organic solvent to form a printing image, said resinous material being a resol resin/epoxy resin mixture wherein the proportion of resol resin in the mixture is such that the number of hydroxyl groups contributed by the resol resin is at least equal to the number of epoxy groups contributed by the epoxy resin, and d. removing the less soluble areas of the image-wise exposed layer to obtain the printing plate.

2. Process according to claim 1, and comprising the additional step of etching the revealed areas of the support prior to applying the lacquer.

3. Process according to claim 1 and comprising the additional step of heating the printing image.

4. Process for producing a lithographic printing plate, which comprises the steps of:

a. image-wise exposing a pre-sensitized light-sensitive plate comprising a support coated with a light sensitive layer, b. developing the image-wise exposed layer selectively to remove the relatively more soluble areas of the image-wise exposed alyer, and c. applying a lacquer to the less soluble areas of the image-wise exposed layer remaining on the support to form a printing image, said lacquer comprising a resinous material dissolved in an organic solvent and said resinous material being a resol resin/epoxy resin mixture wherein the proportion of resol resin in the mixture is such that the number of hydroxyl groups contributed by the resol resin is at least equal to the number of epoxy groups contributed by the epoxy resin.

5. Process according to claim 4, and comprising the additional step of heating the printing image.

6. Process according to claim 3, wherein the lacquer additionally includes a novolac resin.

7. Process according to claim 1, wherein said resinous material comprises from 20 to 70 percent by weight of epoxy resin and from 80 to 30 percent by weight of resol resin.

8. Process according to claim 1, wherein some or all of the resol resin and epoxy resin in the mixture are condensed together.

9. Process according to claim 5, wherein the lacquer additionally includes a novolac resin.

10. Process according to claim 4, wherein said resinous material comprises from 20 to 70 percent by weight of epoxy resin and from 80 to 30 percent by weight of resol resin.

11. Process according to claim 4, wherein the organic solvent is water immersible and wherein the lacquer includes an aqueous desensitizing phase.

12. Process according to claim 4, wherein some or all of the resol resin and the epoxy resin in the mixture are consensed together.

* * * * *